US010648842B2

(12) United States Patent
Croteau (10) Patent No.: US 10,648,842 B2
(45) Date of Patent: May 12, 2020

(54) FLUID FLOW MEASURING AND CONTROL DEVICES AND METHOD

(71) Applicant: HOMEBEAVER INC., Montreal (CA)

(72) Inventor: Steve Croteau, Montreal (CA)

(73) Assignee: Benoit & Cote inc., Montréal (CA)

( * ) Notice: Subject to any disclaimer, the term of this patent is extended or adjusted under 35 U.S.C. 154(b) by 102 days.

(21) Appl. No.: 15/629,990

(22) Filed: Jun. 22, 2017

(65) Prior Publication Data

US 2017/0370754 A1    Dec. 28, 2017

Related U.S. Application Data

(60) Provisional application No. 62/353,330, filed on Jun. 22, 2016.

(51) Int. Cl.
*G01F 5/00* (2006.01)
*F16K 37/00* (2006.01)
(Continued)

(52) U.S. Cl.
CPC .............. *G01F 5/00* (2013.01); *F16K 17/36* (2013.01); *F16K 31/402* (2013.01);
(Continued)

(58) Field of Classification Search
CPC ... G01F 5/00; G01F 1/06; G01F 1/065; G01F 1/075; G01F 25/0007; F16K 17/36;
(Continued)

(56) References Cited

U.S. PATENT DOCUMENTS 2,324,606 A * 7/1943 Wagner ................ G01F 1/06
188/306
3,807,229 A * 4/1974 Chiles ................. G01F 1/82
73/203
(Continued)

FOREIGN PATENT DOCUMENTS

CA      2418814     2/2002
WO      9726509     7/1997
WO      WO-0163221 A1 * 8/2001  ............ G01F 1/075

OTHER PUBLICATIONS

International Search Report, (PCT Article 18 and Rules 43 and 44), PCT/CA2017/050761, by Stephen Hartling, dated Sep. 20, 2017, 7 pages.

*Primary Examiner* — William M McCalister
(74) *Attorney, Agent, or Firm* — Benoit & Cote, Inc.; C. Marc Benoit (57) ABSTRACT

There is described a fluid flow measuring and control device for installation within plumbing. The device comprises a main flow channeling system having an inlet and an outlet for connection to the plumbing, and a bypass channeling system in parallel from the main flow channeling system. A flowmeter is provided in the bypass channeling system for measuring the fluid flow in the bypass channeling system and thereby estimating the fluid flow at the inlet or at the outlet of the main flow channeling system. The flowmeter may comprise a wheel and a pair of movement sensors. A valve such as a solenoid valve can be provided as an on/off control for the plumbing. Using a microcontroller, the device can identify which appliance is used and determine consumption, or detect abnormal use or leaks and close the valve and/or notify a user mobile device.

12 Claims, 9 Drawing Sheets

(51) Int. Cl.
    *F16K 31/40*            (2006.01)
    *G01M 3/26*            (2006.01)
    *G01F 25/00*           (2006.01)
    *G01M 3/28*            (2006.01)
    *F16K 31/06*           (2006.01)
    *G01F 1/06*             (2006.01)
    *G01F 1/075*           (2006.01)
    *F16K 17/36*           (2006.01)

(52) U.S. Cl.
    CPC .............. *F16K 37/005* (2013.01); *G01F 1/06* (2013.01); *G01F 1/065* (2013.01); *G01F 1/075* (2013.01); *G01F 25/0007* (2013.01); *G01M 3/26* (2013.01); *G01M 3/2815* (2013.01); *F16K 31/06* (2013.01)

(58) Field of Classification Search
    CPC ...... F16K 31/402; F16K 37/005; F16K 31/06; G01M 3/26; G01M 3/2815; Y10T 137/7761
    USPC ..................................................... 137/487.5
    See application file for complete search history.

(56) References Cited

U.S. PATENT DOCUMENTS

| | | | | |
|---|---|---|---|---|
| 4,648,270 A * | 3/1987 | Johnson | | G01F 5/00 73/202.5 |
| 4,684,270 A * | 8/1987 | Sakurai | | B41J 3/546 101/93.04 |
| 4,730,637 A * | 3/1988 | White | | E03B 7/12 137/468 |
| 5,086,806 A * | 2/1992 | Engler | | G01F 15/003 137/486 |
| 5,771,920 A * | 6/1998 | Jewett | | E03B 7/071 137/460 |
| 5,782,263 A * | 7/1998 | Isaacson, Jr. | | F16K 17/20 137/459 |
| 5,979,493 A * | 11/1999 | Simpkins, Jr. | | F16K 17/20 137/487.5 |
| 6,374,846 B1 * | 4/2002 | DeSmet | | E03B 7/071 137/15.01 |
| 7,299,814 B2 * | 11/2007 | Fenton | | F17D 5/02 137/1 |
| 7,308,824 B2 * | 12/2007 | Trescott, Jr. | | G01M 3/002 73/204.11 |
| 8,606,413 B2 * | 12/2013 | Picton | | E03B 7/071 700/282 |
| 8,939,016 B2 * | 1/2015 | Brasel | | B67D 1/12 340/605 |
| 9,010,360 B1 * | 4/2015 | Older | | F16K 21/16 137/486 |
| 9,139,986 B2 * | 9/2015 | Smith | | E03C 1/025 |
| 9,297,150 B2 * | 3/2016 | Klicpera | | E03B 7/071 |
| 9,322,694 B2 * | 4/2016 | Seehoffer | | G01F 15/063 |
| 9,324,228 B2 * | 4/2016 | Trout | | G08B 21/20 |
| 2001/0018927 A1 * | 9/2001 | Gill | | G05D 7/0635 137/487.5 |
| 2002/0145568 A1 * | 10/2002 | Winter | | G01D 4/006 343/701 |
| 2002/0148515 A1 * | 10/2002 | Coffey | | E03B 7/071 137/624.11 |
| 2003/0234039 A1 * | 12/2003 | Shajii | | G01F 1/684 137/12 |
| 2006/0009928 A1 * | 1/2006 | Addink | | E03B 7/071 702/50 |
| 2006/0027267 A1 * | 2/2006 | Fritze | | F17D 5/02 137/487.5 |
| 2006/0076053 A1 * | 4/2006 | McGill | | F16K 3/0209 137/39 |
| 2006/0137090 A1 * | 6/2006 | Jeffries | | G01M 3/2807 4/664 |
| 2007/0095400 A1 * | 5/2007 | Bergquist | | F16K 7/14 137/485 |
| 2008/0188991 A1 * | 8/2008 | Mulligan | | F17D 5/06 700/282 |
| 2008/0224892 A1 * | 9/2008 | Bogolea | | G01D 4/004 340/870.3 |
| 2009/0194719 A1 * | 8/2009 | Mulligan | | E03B 7/071 251/129.01 |
| 2009/0320552 A1 * | 12/2009 | Samani | | G01F 5/00 73/1.16 |
| 2010/0188261 A1 * | 7/2010 | Fujii | | F23N 5/242 340/870.02 |
| 2010/0212748 A1 * | 8/2010 | Davidoff | | F17D 5/02 137/10 |
| 2011/0125424 A1 | 5/2011 | Han et al. | | |
| 2011/0303311 A1 * | 12/2011 | Klicpera | | B05B 12/008 137/551 |
| 2012/0180877 A1 * | 7/2012 | Pallais | | G01M 3/002 137/487.5 |
| 2012/0305084 A1 * | 12/2012 | Ball | | G01F 15/14 137/1 |
| 2013/0291974 A1 * | 11/2013 | Bourgeois | | F17D 5/02 137/625.3 |
| 2014/0165719 A1 * | 6/2014 | Williamson | | G01F 1/06 73/272 R |
| 2015/0073731 A1 * | 3/2015 | Yokohata | | F23N 5/26 702/45 |

\* cited by examiner

FLUID FLOW MEASURING AND CONTROL DEVICES AND METHOD

BACKGROUND (a) Field

The subject matter disclosed generally relates to smart home devices. More specifically, it relates to device and methods for measuring fluid flow in piping/plumbing.

(b) Related Prior Art

Devices for measuring fluid flow in piping that qualify as consumer products fail to accurately measure the net flow of fluid in plumbing. Moreover, the addition of these devices to the plumbing installation increases the resistance to the flow, thus decreasing the water pressure.

Furthermore, the existing devices fail to correctly and quantitatively identify the water flow associated with each water-consuming appliance in a building while being installed at a single location in the plumbing installation. One device needs to be paired with each water-consuming appliance, which makes the whole system either not comprehensive, or expensive and complicated to install and maintain.

SUMMARY

According to an aspect of the invention, there is provided a fluid flow measuring and control device for installation within plumbing channeling fluid, the device comprising:
- a main flow channeling system having an inlet and an outlet for connection to the plumbing;
- a bypass channeling system in parallel from the main flow channeling system, starting from a first location on the main flow channeling system and ending at a second location on the main flow channeling system downstream of the first location; and
- a flowmeter provided in the bypass channeling system for measuring the fluid flow in the bypass channeling system and thereby estimating the fluid flow at the inlet or at the outlet of the main flow channeling system.

According to an embodiment, the flowmeter comprises:
- a flowmeter chamber;
- a flowmeter wheel installed in the flowmeter chamber, the flowmeter wheel comprising rotating blades; and
- a pair of movement sensors installed in the flowmeter chamber, each one of the movement sensors monitoring the rotating blades alternately moving in opposite directions and identifying a direction of a rotation movement to assess a net flow through the flowmeter chamber.

According to an embodiment, there is further provided a valve for stopping the fluid flow in the main flow channeling system, hence blocking fluid flow in the plumbing.

According to an embodiment, the valve is a solenoid valve.

According to an embodiment, there is further provided a first pressure sensor upstream of the valve and a second pressure sensor downstream of the valve to determine if the is a pressure drop when the valve is closed.

According to another aspect of the invention, there is provided a system comprising:
- a fluid flow measuring and control device for installation within plumbing that channels a fluid, the device comprising a flowmeter for assessing the fluid flow in the device;
- a transceiver operatively connected to the flowmeter for collecting data therefrom and send the data to a computer; and
- the computer comprising a memory for storing pre-recorded fluid usage signatures of specific appliances and for storing instructions and a processor operatively connected to the memory for executing the instructions to compare the data to the pre-recorded fluid usage signatures for identifying in the data from the flowmeter that a specific appliance was used.

According to an embodiment, the computer is further adapted to at least one of:
- identify an abnormal fluid usage by comparing the data from the flowmeter from previously acquired data from the flowmeter; and
- identify an identity of the specific appliances which consume fluid.

According to an embodiment, the fluid flow measuring and control device comprises:
- a main flow channeling system having an inlet and an outlet for connection to the plumbing;
- a bypass channeling system in parallel from the main flow channeling system, starting from a first location on the main flow channeling system and ending at a second location on the main flow channeling system downstream of the first location.

According to an embodiment, the flowmeter is provided in the bypass channeling system for measuring the fluid flow in the bypass channeling system and thereby estimating the fluid flow at the inlet or at the outlet of the main flow channeling system.

According to an embodiment, the flowmeter comprises:
- a flowmeter chamber;
- a flowmeter wheel installed in the flowmeter chamber, the flowmeter wheel comprising rotating blades; and
- a pair of movement sensors installed in the flowmeter chamber, each one of the movement sensors monitoring the rotating blades alternately moving in opposite directions and identifying a direction of a rotation movement to assess a net flow through the flowmeter chamber.

According to an embodiment, there is further provided a valve for stopping the fluid flow in the main flow channeling system, hence blocking fluid flow in the fluid flow measuring and control device and in the plumbing.

According to an embodiment, the valve is a solenoid valve.

According to an embodiment, there is further provided a first pressure sensor upstream of the valve and a second pressure sensor downstream of the valve to determine if the is a pressure drop when the valve is closed.

According to an embodiment, the computer is operably connected to the first pressure sensor, the second pressure sensor and the valve, to determine from the data from the flowmeter that no appliance is being used and instruct the valve to close to collect pressures from the first pressure sensor and the second pressure sensor.

According to an embodiment, the computer is further adapted to:
- detect that there is a pressure drop and determine from a low to medium pressure drop that it is a leak, and to maintain the valve closed, and
- detect that there is no pressure drop or a high pressure drop indicative of normal use, and reopen the valve.

According to an embodiment, the computer is further adapted to instruct the transceiver to send a notification to a remote server to inform a user mobile device in communication with the remote server.

According to another aspect of the invention, there is provided a method of pattern recognition for fluid use in a plumbing installation to which fluid consuming appliances are fluidly connected, the method comprising:
  installing a fluid flow measuring and control device at a single location in the plumbing installation which is fluidly common to all of the fluid consuming appliances;
  capturing and storing data relative to flow rate of each one of the fluid consuming appliances in the plumbing installation through the fluid flow measuring and control device;
  analysing and recording the data to determine a fluid usage signature for each of the fluid consuming appliances, thereby resulting in pre-recorded fluid usage signatures for each of the fluid consuming appliances.

According to an embodiment, there is further provided, in an actual use of the plumbing installation:
  comparing an actual measurement of the fluid flow measuring and control device to the pre-recorded fluid usage signatures for each of the fluid consuming appliances to identify which one of the fluid consuming appliances corresponds to the actual measurement.

According to an embodiment, there is further provided:
  comparing an actual measurement of the fluid flow measuring and control device to the pre-recorded fluid usage signatures over a given recurring period to identify a difference with the pre-recorded fluid usage signatures;
  issuing a notification signal upon determining that the difference exceeds a given threshold.

According to an embodiment, there is further provided:
  identifying that the actual measurement of the fluid flow measuring and control device contains none of the pre-recorded fluid usage signatures;
  temporarily shutting a valve in the fluid flow measuring and control device;
  measuring a first pressure upstream of the valve and a second pressure downstream of the valve;
  identifying a difference between the first pressure and the second pressure; and:
  if the difference is zero or is above a threshold indicative of normal use, reopen the valve;
  otherwise, maintain the valve closed.

According to an embodiment, there is further provided issuing a notification signal to a user mobile device if the valve is maintained closed.

According to an embodiment, the valve is a solenoid valve and shutting the valve and reopening the valve is performed using an electrical current.

According to an embodiment, capturing and storing data relative to flow rate is performed by a microcontroller of the fluid flow measuring and control device.

According to an embodiment, analysing and recording the data is performed by a computer remote from the fluid flow measuring and control device.

According to an embodiment, there is further provided: providing a network and sending the data captured by the fluid flow measuring and control device to the remote computer over the network.

According to an embodiment, capturing data relative to flow rate through the fluid flow measuring and control device comprises operating a flowmeter in a bypass channeling system in parallel from and fluidly connected to the main flow channeling system.

According to an embodiment, the flowmeter comprises:
  a flowmeter chamber;
  a flowmeter wheel installed in the flowmeter chamber, the flowmeter wheel comprising rotating blades; and
  a pair of movement sensors installed in the flowmeter chamber, each one of the movement sensors monitoring the rotating blades alternately moving in opposite directions.

According to an embodiment, there is further provided identifying, with the pair of movement sensors, a direction of a rotation movement of the flowmeter wheel to measure the flow rate including backflow, thereby assessing a net flow through the flowmeter chamber.

According to another aspect of the invention, there is provided a flowmeter. The flowmeter comprises a flowmeter chamber; a flowmeter wheel installed in the flowmeter chamber, the flowmeter wheel comprising rotating blades; and a pair of movement sensors installed in the flowmeter chamber, each one of the movement sensors monitoring the rotating blades alternately moving in opposite directions and identifying a direction of the rotation movement to assess a net flow through the flowmeter chamber.

According to another aspect of the invention, there is provided a fluid flow measuring and control device for installation within plumbing channeling fluid. The device comprises a flowmeter for measuring the fluid flow in the device; and a solenoid valve for stopping the fluid flow in the device, hence blocking fluid flow in the plumbing.

According to another aspect of the invention, there is provided a method for detecting leaks in a plumbing installation to which fluid consuming appliances are fluidly connected, the method comprising:
  installing a fluid flow measuring and control device at a single location in the plumbing installation which is fluidly common to all of the fluid consuming appliances;
  capturing and storing data relative to flow rate of each one of the fluid consuming appliances in the plumbing installation through the fluid flow measuring and control device;
  analysing and recording the data to determine a fluid usage signature for each of the fluid consuming appliances, thereby resulting in pre-recorded fluid usage signatures for each of the fluid consuming appliances
  determining a baseline leakage; and
  detecting a leak in addition to the baseline leakage.

According to another aspect of the invention, there is provided a method for detecting abnormal use in a plumbing installation to which fluid consuming appliances are fluidly connected, the method comprising:
  installing a fluid flow measuring and control device at a single location in the plumbing installation which is fluidly common to all of the fluid consuming appliances;
  capturing and storing data relative to flow rate of each one of the fluid consuming appliances in the plumbing installation through the fluid flow measuring and control device;
  analysing and recording the data to determine a fluid usage signature for each of the fluid consuming appliances, thereby resulting in pre-recorded fluid usage signatures for each of the fluid consuming appliances
  identifying a flow that is abnormal as it does not comprise any fluid usage signature, or as it comprises a fluid usage signature used in an abnormal pattern; and
  closing a valve of the fluid flow measuring and control device to turn the flow off.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
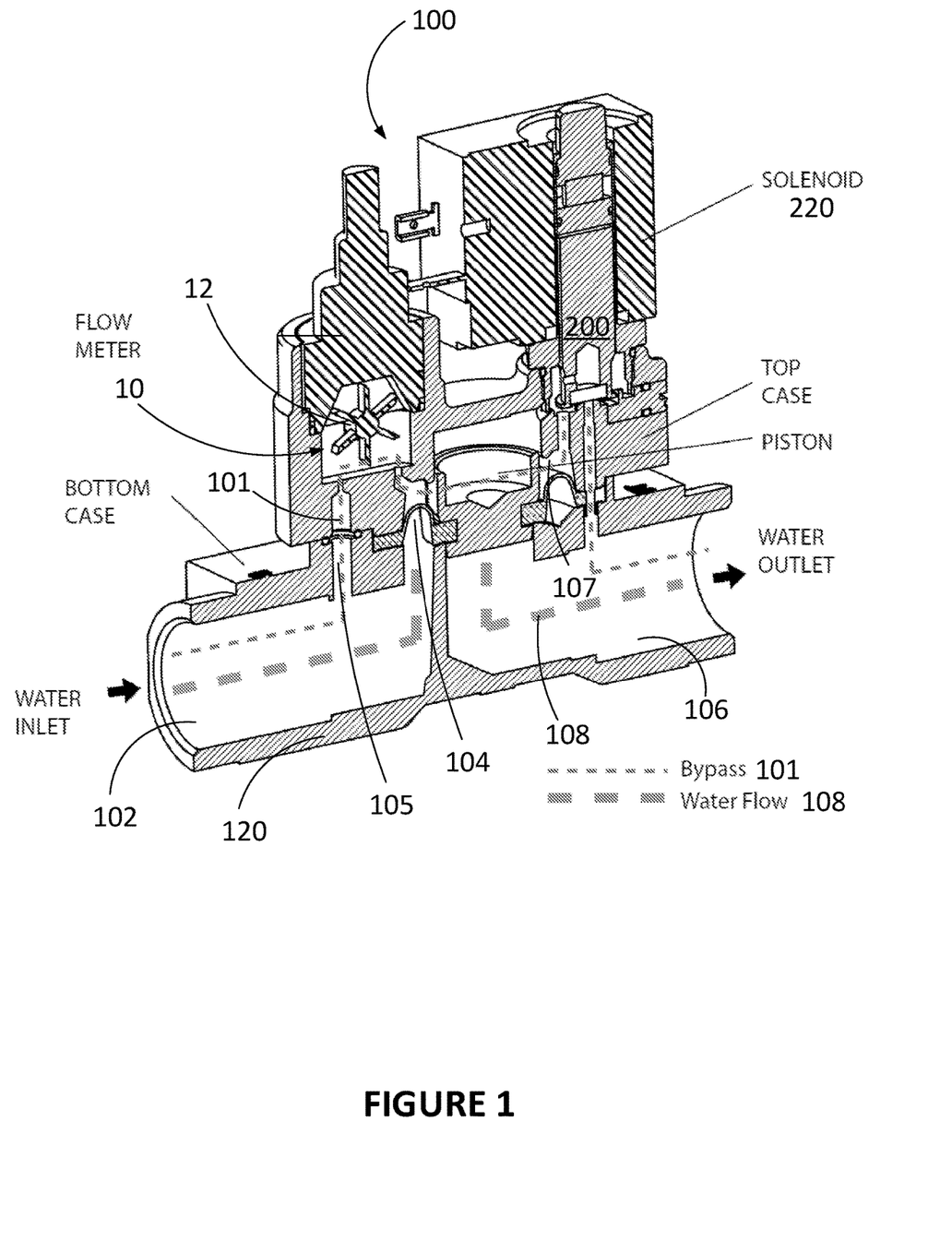
FIG. 1 is a cross-section perspective view illustrating the water flow measuring and control device with water flowing therein, including the main water flow and the bypass water flow, according to an embodiment.

There is described herein and shown in FIG. 1 a water flow measuring and control device 100 to measure the flow of water within plumbing or more generally piping. The water flow measuring and control device 100 is a part of a water flow measuring system 500 which can perform various tasks, as described further below.

The water flow measuring and control device 100 described herein combines, within a single device and in a cost-effective way, on/off flow control, water flow rate monitoring, backflow detection and measurement, pattern recognition, total and individual consumption of a plurality of appliances with the single device installed at a single location, recognition of abnormal water usage, and high resolution to achieve very small flow detection (i.e., leaks).

It should be understood that the water flow measuring and control device 100 is normally used to measure the flow of water; however, the flow of any other liquid or fluid could be measured by the device 100 (as long as the viscosity is not too high, which could obstruct the device 100). Therefore, "water", "fluid" and "liquid" are used herein interchangeably.

FIG. 1 is a cross-section illustrating the water flow measuring and control device 100 with water flowing therein, including the main water flow and the bypass water flow which is the one to be measured in order to assess the overall water flow.

The water flow measuring and control device 100 performs two basic functions. It is first used as a shut-off valve for the piping to which it is connected, thereby shutting off the downstream water flow.

According to an embodiment, the shut-off valve 200 is a solenoid valve (or electrovalve), i.e., it is driven by a solenoid 220. The solenoid 220 is a multiple coil in which electric current can flow to create a magnetic field in the solenoid and outside its free ends, where the magnetic field can be acted upon by changing (including starting and stopping) the electric current. Therefore, the shut-off valve 200 can be closed by having an electric current, flow into the solenoid 220, or vice versa, the electric current being activated by electronic, electrical or mechanical means, as described further below.

The water flow measuring and control device 100 comprises a flowmeter 10 for measuring a flow of water or any other liquid flowing therein.

Providing both water flow rate monitoring devices (i.e., the flowmeter 10) and flow control (on/off) devices (i.e., the shut-off valve 200 and related parts) within a single assembly (i.e., within the water flow measuring and control device 100) reduces the number of parts that need to be integrated to plumbing installations, thereby optimizing the plumbing installation.

According to an embodiment, the flowmeter 10 comprises a wheel 12 which spins when liquid flows therethrough.

According to an embodiment, the wheel 12 is monitored using sensors 15 which are movement sensors monitoring the spinning speed of the wheel 12.

Figure 3:
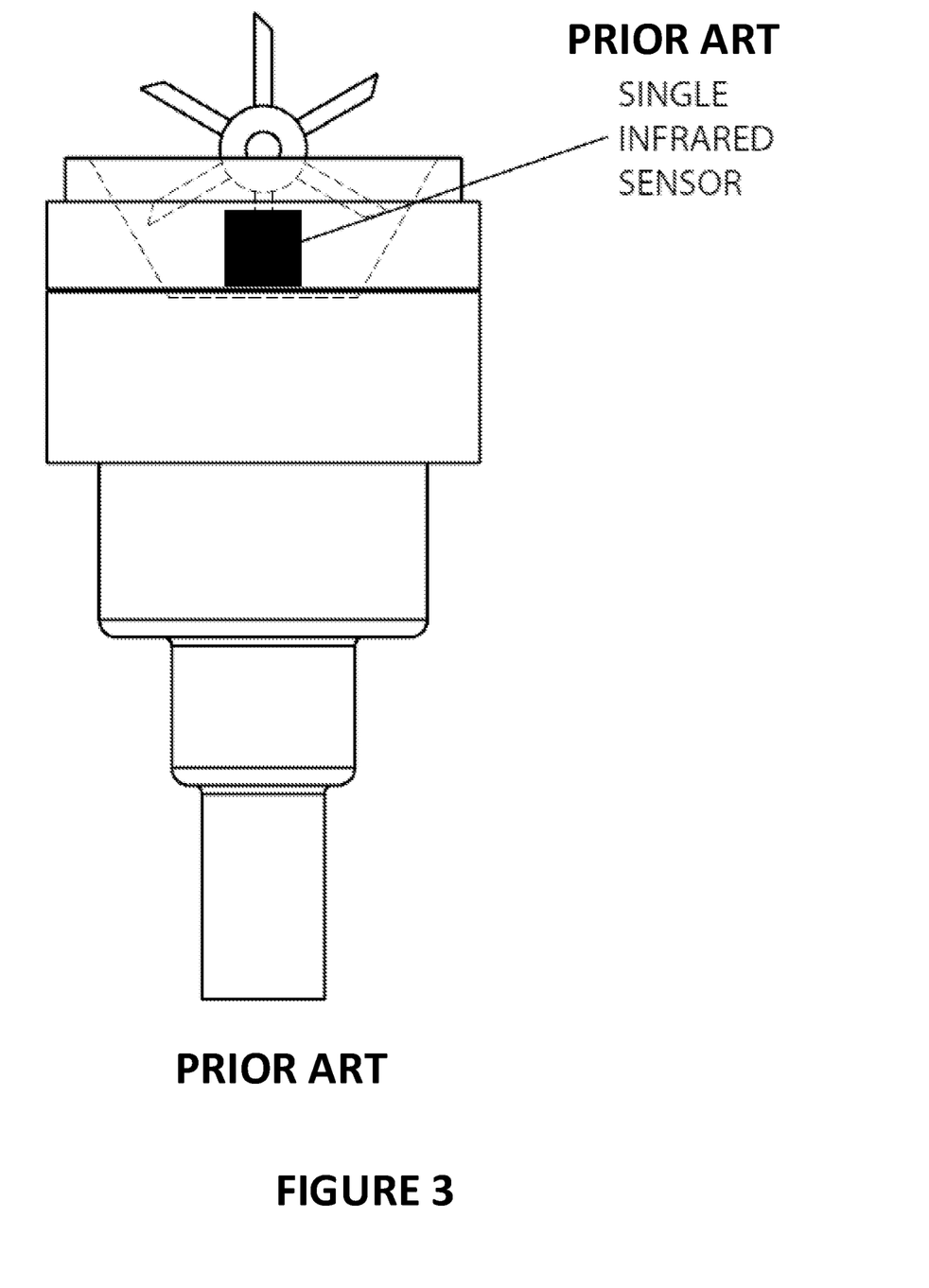
FIG. 3 is a side view illustrating a flowmeter with a single sensor, according to the prior art.

As shown in FIG. 3, prior art devices comprise only one sensor to monitor a wheel spinning in the flow.

Figure 4:
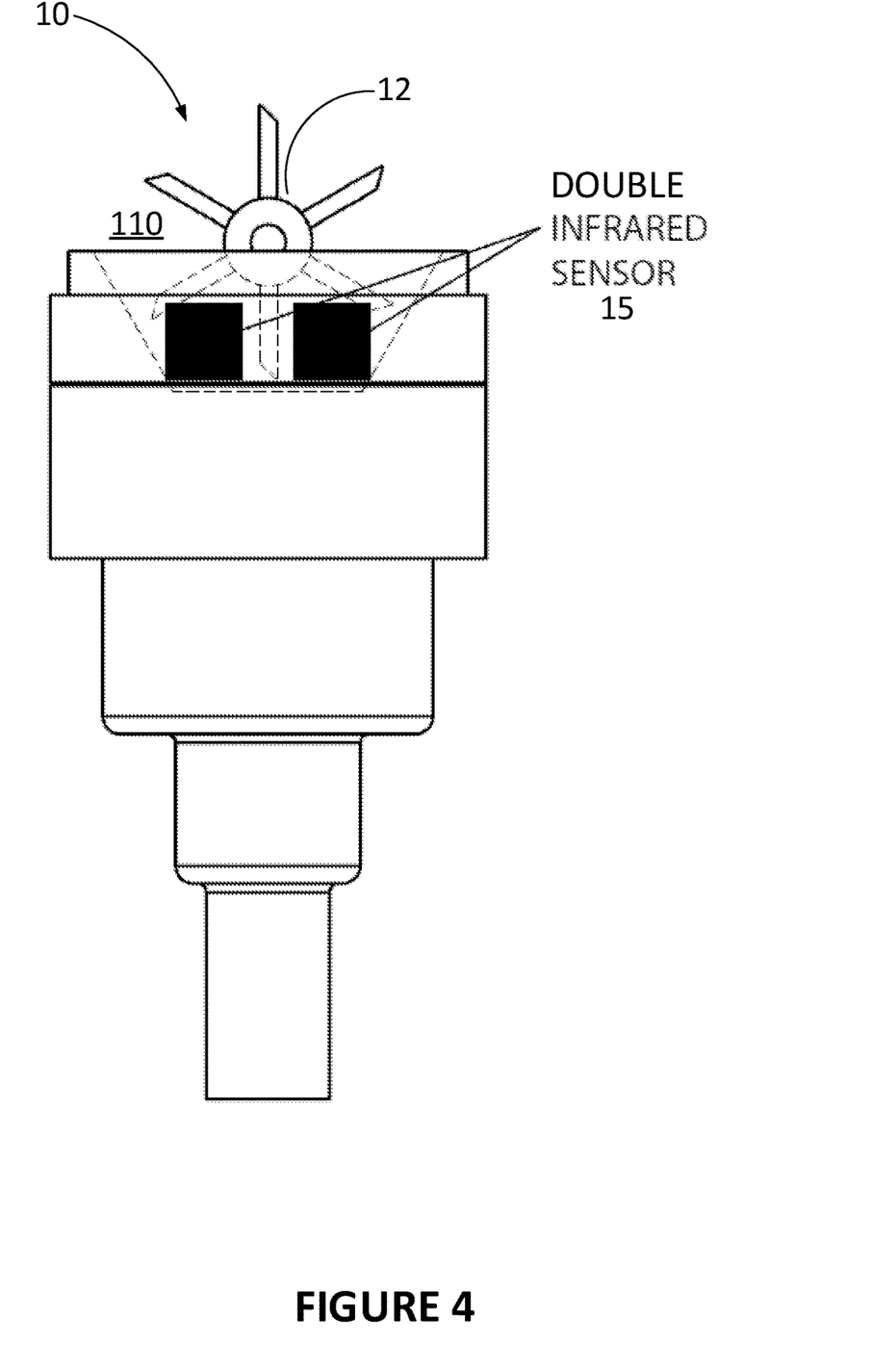
FIG. 4 is a side view illustrating a flowmeter with a double sensor, according to an embodiment.

As shown in FIG. 4, the embodiments described herein can rather comprise two sensors 15. Having a pair of sensors 15 monitor the wheel 12 is advantageous since it enables detecting and measuring the direction of movement of the wheel 12 and the backflow of liquid in the piping. This backflow is often present in the piping, especially in facilities larger than single residences, for example in hotels. More technically, backflow is common where the entry pipe is branched off a larger pipe. The flow of the larger pipe induces backflow from the tributary pipe even when there is no water usage on the tributary. In hotels and other large facilities, it is common practice to flush the water in both directions. Having only one sensor monitor the wheel 12 provides insufficient information for establishing that a backflow is occurring. Therefore, the measure of a flow occurring a certain period as performed by a single-sensor arrangement does not provide the correct data if backflow is occurring. If the normal flow is 10 liters over one minute and backflow is 1 liter over this minute, the single-sensor arrangement may provide a measurement of 11 liters in total over this minute, while the correct answer would be a net flow of 9 liters.

The double-sensor arrangement shown in FIG. 4, because of the duplicity of the sensor 15, is able to identify a change in the spinning direction of the wheel and therefore eventually subtract the flow which occurs in the opposite direction, thereby measuring more accurately the net flow of water (in the previous example, the net flow would be rightly estimated as 9 liters and not 11 liters like in a single-sensor arrangement). Therefore, if the embodiment comprises a wheel 12 with at least a pair of sensors 15 (i.e., with more than one sensor 15 monitoring different positions on the same wheel), the result will be more accurate or exact (in the sense of correctly representing the actual flow) than with a wheel 12 monitored with only one sensor 15. The result obtained from the wheel 12 with at least a pair of sensors 15 may not be more precise (i.e., the number of decimals in the measurement may be the same), but it is likely that the result will be different from the result obtained with a single-sensor arrangement as shown in FIG. 3, and this result from the double-sensor arrangement will be closer to the actual value of the net flow.

Depending on the embodiment, the sensors 15 can be infrared sensors or Hall-effect sensors. The use of Hall-effect sensors requires that the blades of wheels exhibit at least some ferromagnetic properties (or at least can generate a measurable magnetic field) to generate an electric signal within the Hall-effect sensors by which the blades move. Alternatively, infrared sensors require that the blades of the wheel reflect the infrared light emitted and detected by the infrared sensors.

According to an embodiment, the measurement of the water flow rate is converted to a frequency that is directly proportional to the flow rate through the pipe fitting. The frequency signal is sampled at a sampling frequency, which is many times the Nyquist frequency, by the embedded microcontroller to enable high pass filtering of glitches and jitter, and also to subtract backflow. A frequency sample is calculated every second, buffered in a buffer of the embedded microcontroller, and sent to a database in the cloud via the network. Therefore, the flow may not be measured directly. It is rather measured indirectly by measuring a parameter indicative of the flow, such as an electrical signal having a frequency determined by the rotating wheel 12 and which is proportional to the flow, to be able to assess the actual rate of the flow. Measuring the flow should therefore be viewed as measuring any parameter or value representative of the flow and from which the flow can be directly and accurately inferred.

Figure 2:
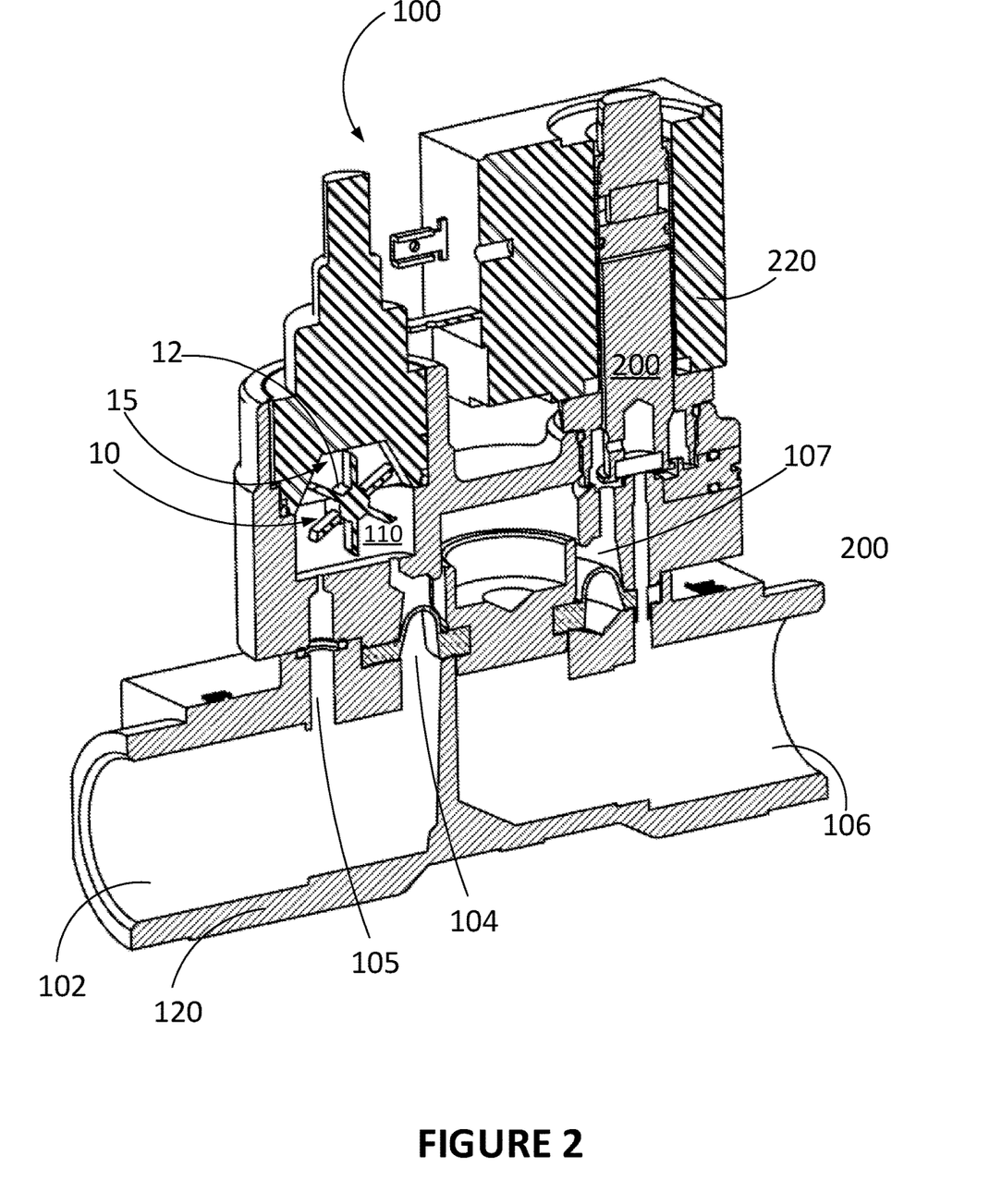
FIG. 2 is a cross-section perspective view illustrating the water flow measuring and control device of FIG. 1 without markings for better readability.

As shown in FIGS. 1-2, the water flows into the water flow measuring and control device 100 by a water inlet 102, which is connected to the piping in which water flows originally, such as residential plumbing. The water inlet 102 has the shape of a pipe and should be easily connectable to the piping, for example by being of the same diameter as the piping. Similarly, a water outlet 106 with a shape, size and other properties consistent with the piping is provided at another end of the water flow measuring and control device 100. Homes, condos, and hotels in North America are typically ½ to 1-inch piping. Commercial piping is typically 1 inch and higher. Nominal water pressure for most residential homes is in the range of 40-70 psi (pounds per square inch) but can be as low as 20, and higher than 100.

Between the water inlet 102 and the water outlet 106, there is a closable channel 104. The closable channel 104 is the channel that contains the shut-off valve 200, which can be, for example, a piston movable in translation along a specific direction.

While the water flow measuring and control device 100 is described as measuring the flow of water, most of the water flow does not reach the flowmeter 10 and rather flows unobstructed throughout the water flow measuring and control device 100 by flowing through the water inlet 102, a closable channel 104, and the water outlet 106, which make up what is herein defined as a main flow channeling system 108. The body 120 is the solid material which is shaped to define the cavities or lumens through which water can flow, e.g., the main flow channeling system 108 or the bypass channeling system 101, described further below.

The water flowing from the water inlet 102 through the closable channel 104 to the water outlet 106 is therefore unaffected by any flowmeter 10 that could produce resistance or perturbations in the flow which would decrease the efficiency of the plumbing. The isolation of the bypass channeling system 101, described below, from the main chamber ensures there are no obstacles in the main flow path that can reduce pressure and there are no obstacles the main flow path that could cause accumulation of debris or deposits that would reduce pressure over time.

There is nonetheless a fraction of the overall flow that needs to be diverted to the location of the flowmeter 10 so that the flow is actually measured. A bypass 105 is therefore provided within the water flow measuring and control device 100. This bypass 105 is a channel that connects the water inlet 102 to the flowmeter chamber 110. The flow of water inside the flowmeter chamber 110 makes the wheel 12 spin; this rotation is then measured by the sensors 15. The water then keeps flowing through the closable bypass 107 which can be shut by the shut-off valve 200 (or a piece which closes as the shut-off valve 200 closes), and which connects to the water outlet 106. The isolation of the bypass channeling system 101 enables a smaller and less costly flow sensor to be used.

The bypass channeling system 101, including the bypass 105, the flowmeter chamber 110 and the closable bypass 107, should be designed to have a known fraction or proportion of the overall water flow flowing therethrough. Once designed, the water flow measuring and control device 100 therefore needs to be characterized (e.g., in a lab where a known flow is inputted into the water flow measuring and control device 100) to determine that 10% (for example) of the overall water flow (the one that enters the water inlet 102) flows through the bypass channeling system 101.

The exact fraction depends on the size, shape and configuration of the bypass channeling system 101 with respect to the main flow channeling system 108 (which comprises the water inlet 102, the closable channel 104, and the water outlet 106). For example, the diameter of the small entry point of the bypass 105 at the periphery of the water inlet 102 has a significant impact on this fraction. For the embodiments illustrated in the figures, empirical results show that the flow rate of water through the main chamber is proportional to the flow rate in the bypass chamber. The linearity of the relation has been verified from 0 L/minute up to sustained pressure of 168 L/minute (a home typically has a flow of 20 to 30 L/minute). By calibrating the water flow measuring and control device 100, it is possible to draw a relationship between the speed of the wheel 12 as measured by the flowmeter and the flow of water in the water flow measuring and control device 100, usually expressed in volume per unit of time or other equivalents (e.g., mass per unit of time).

The fraction of water flowing into the bypass channeling system 101 may also be nonlinear and therefore the fraction will vary with the overall water flow; as long as the relation is characterized and known, the knowledge of the water flow in the bypass channeling system 101 as determined from the monitoring of the wheel 12 implies that the overall water flow can be estimated with a relatively high precision.

The flowmeter chamber 110 should be shaped, and the bypass 105 and closable bypass 107 should be arranged, in a way that favors simple or predictable flows within the flowmeter chamber 110. As shown in FIGS. 1-2, the inflow of water into the flowmeter chamber arrives from the bottom thereof vis-à-vis one side of the wheel 12 and outflows vis-à-vis the other side of the wheel 12, still at the bottom of the flowmeter chamber 110. The water therefore moves along a semi-circular path within the flowmeter chamber 110, which is consistent with the circular shape of the wheel 12. To aid in achieving this semi-circular flow, the top of the flowmeter chamber 110 is shaped in a substantially semi-circular fashion or, as shown, using incrementally inclined surfaces which make up the shape of half a hexagon or an octagon. The exact shape can vary from these examples, but the top of the flowmeter chamber should let the wheel 12 spin freely, while being close to its blade to maintain flowing water within the blades of the wheel 12.

According to an embodiment, there is provided a thermometer 20 for measuring the temperature of the liquid flowing in the water flow measuring and control device 100. The thermometer 20 can be provided in the flowmeter chamber 110, e.g., with the sensors 15, or elsewhere in the water flow measuring and control device 100 since the temperature of the liquid should be approximately consistent within the water flow measuring and control device 100.

Figure 5:
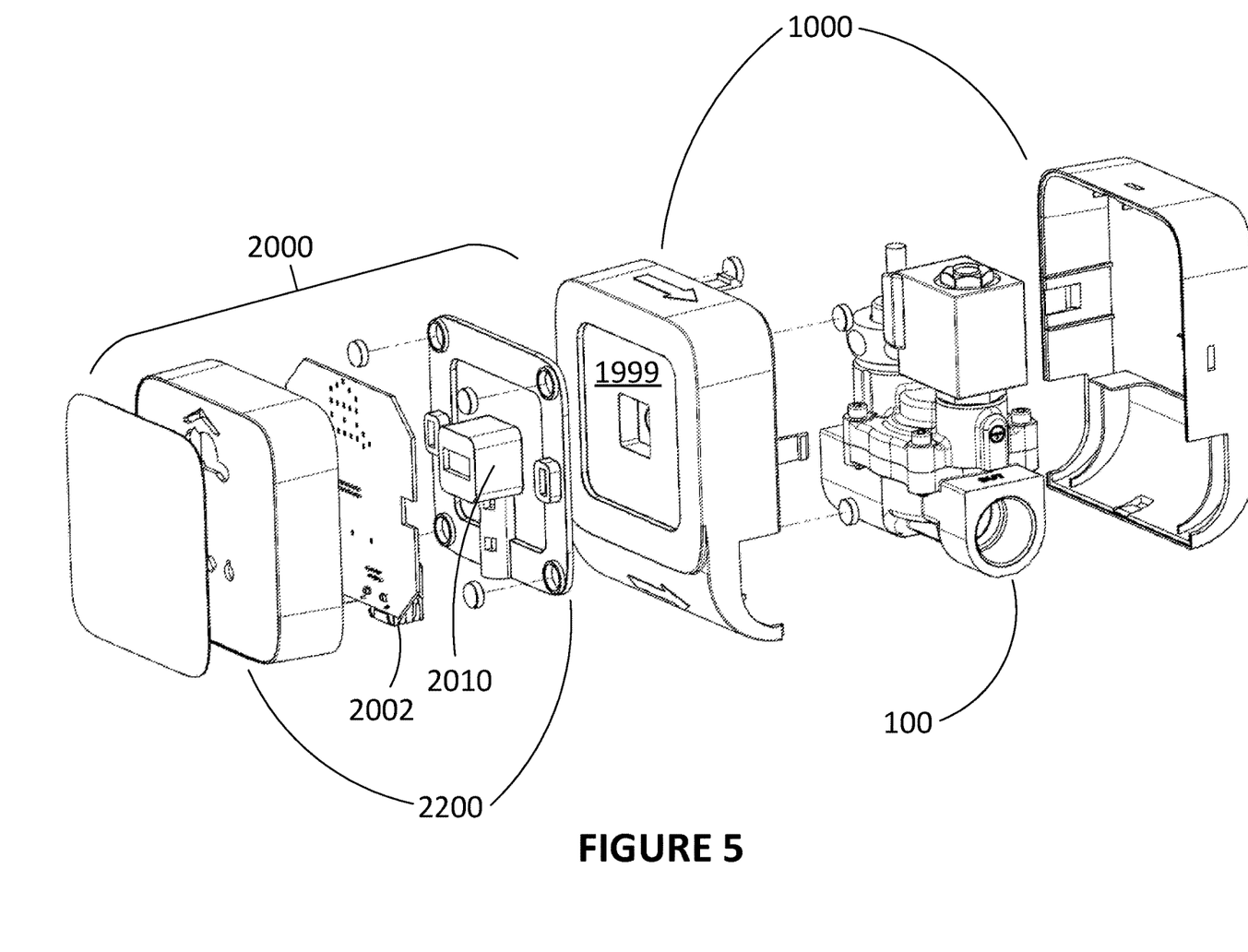
FIG. 5 is an exploded perspective view illustrating the water flow measuring and control device in a casing, with a transceiver, according to an embodiment.
Figure 6:
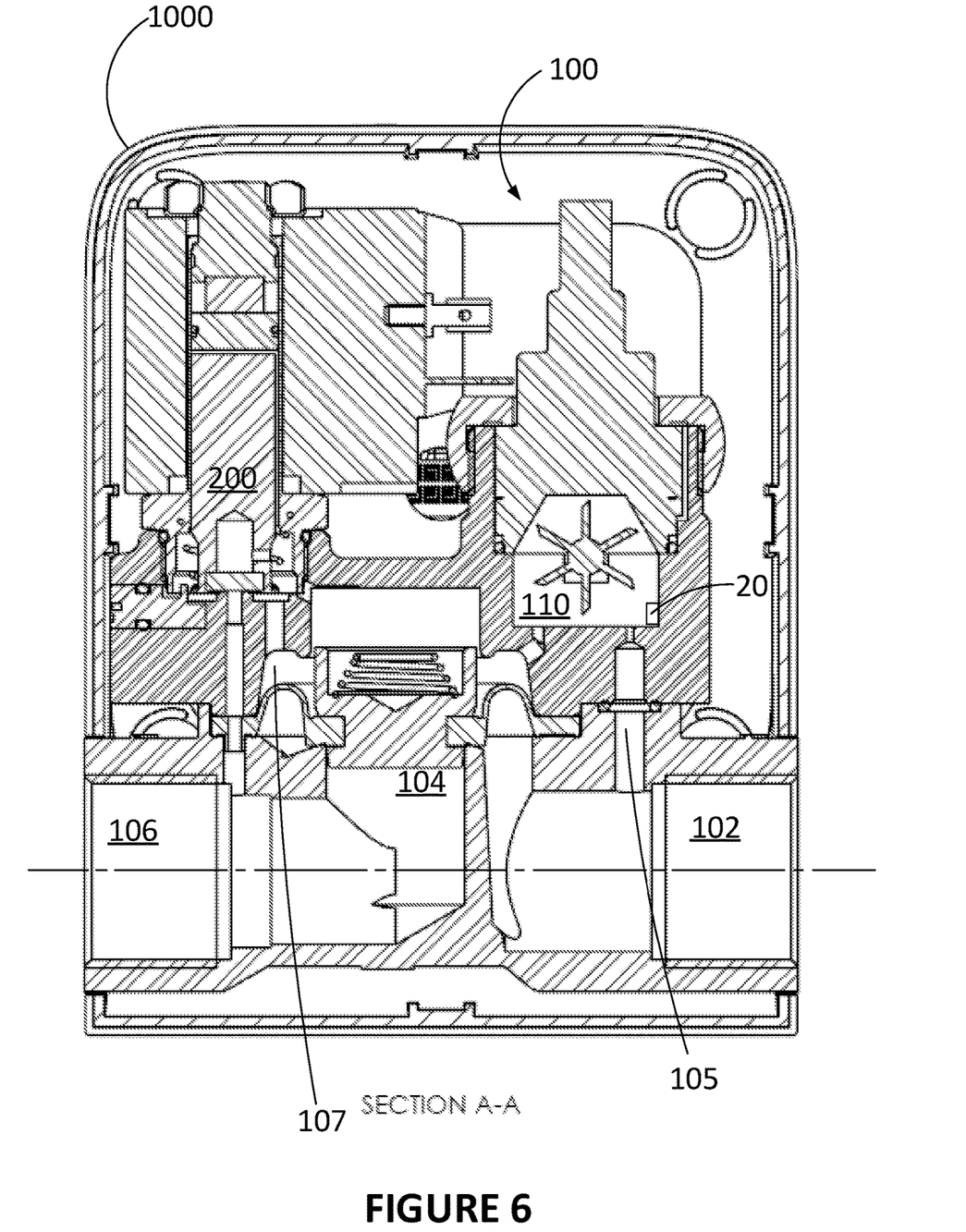
FIG. 6 is a cross-section side view illustrating the water flow measuring and control device in a casing, according to an embodiment.
Figure 7:
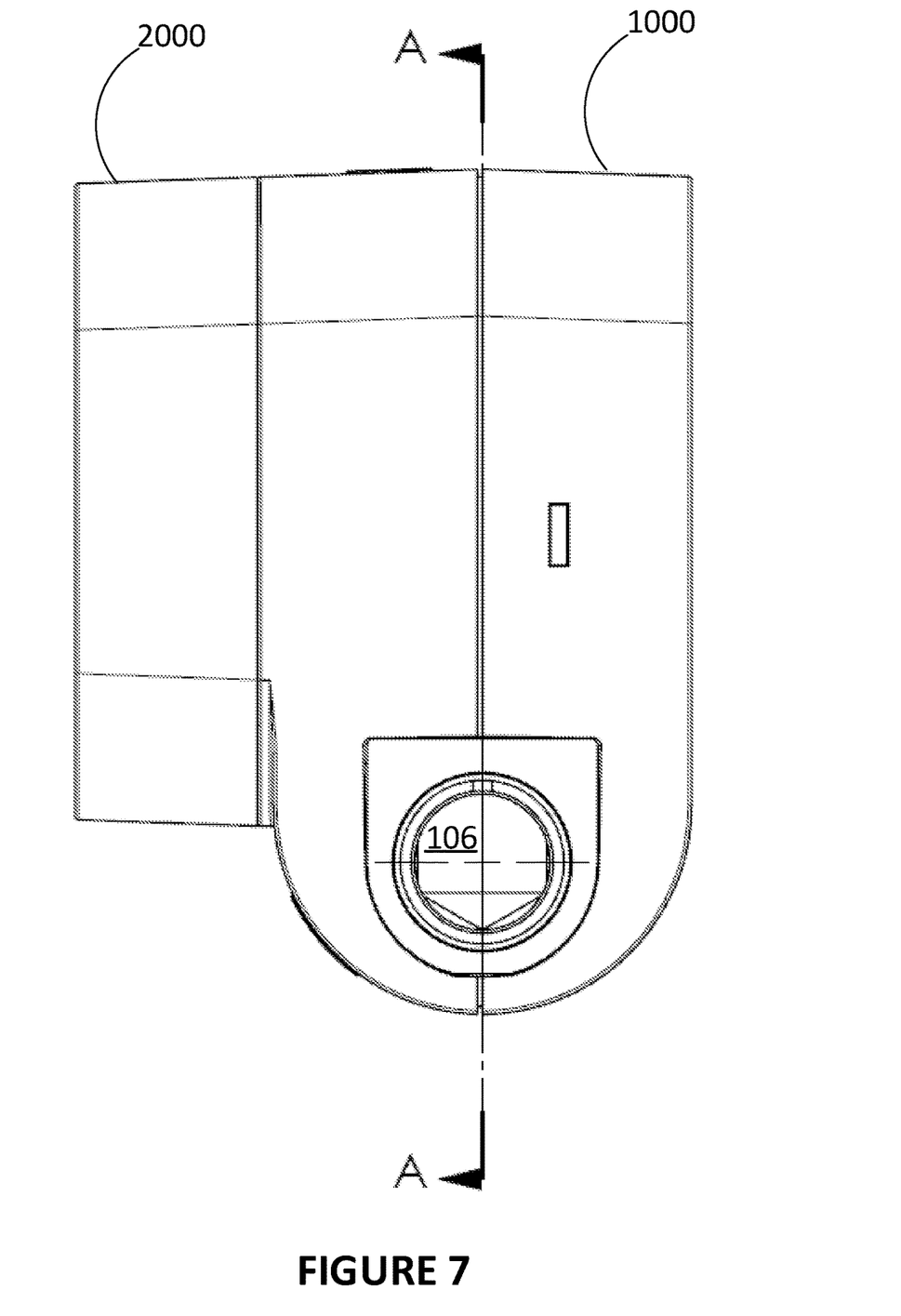
FIG. 7 is a front view illustrating the water flow measuring and control device in a casing, with a transceiver, according to an embodiment.
Figure 8A:
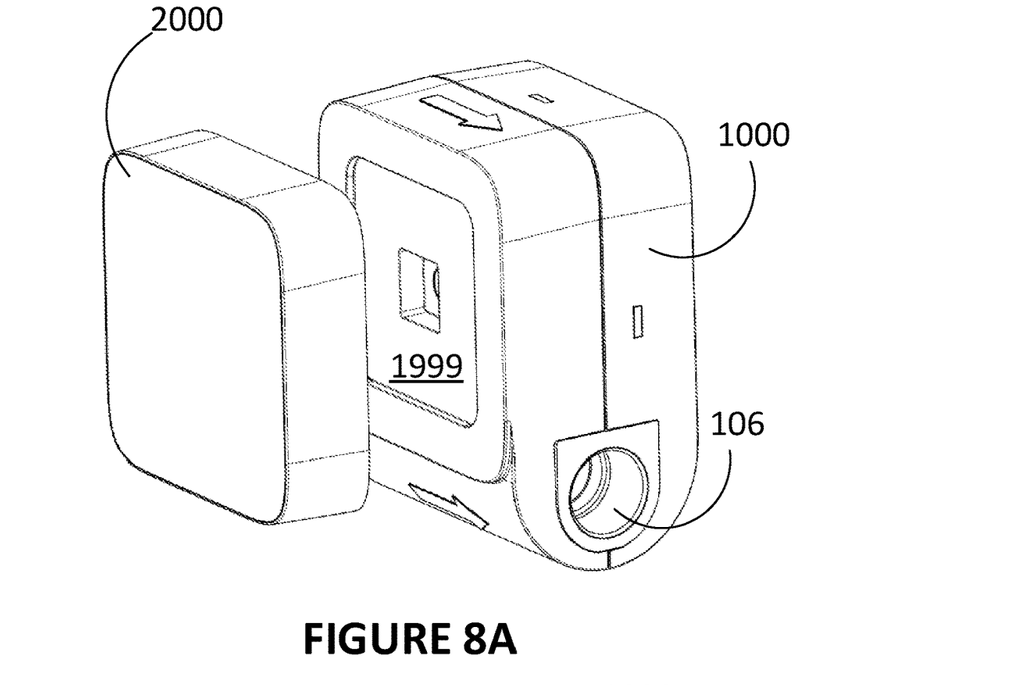
FIGS. 8A-8B are perspective views illustrating the water flow measuring and control device in a casing, with a transceiver detached from the casing, according to an embodiment.
Figure 8B:
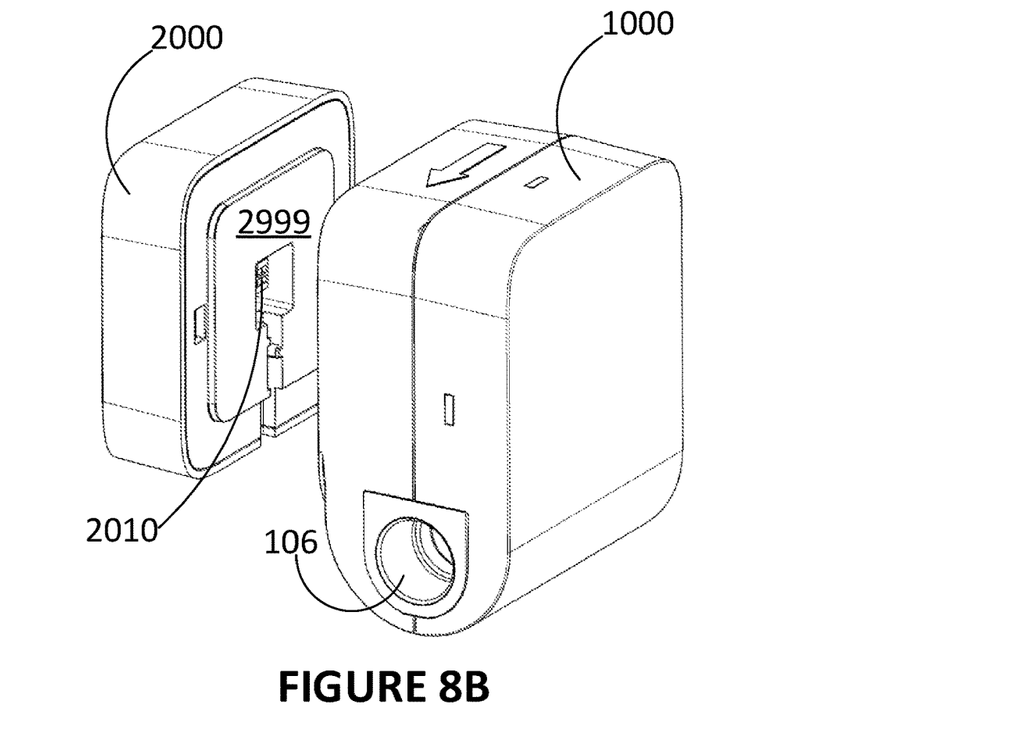

According to an embodiment, the water flow measuring and control device 100 is contained in an enclosure or casing 1000, as shown in FIGS. 5-6. The casing 1000 protects the water flow measuring and control device 100 from manipulation. As shown in FIG. 5, the casing 1000 can be made of two interlocking walls which mate and enclose the water flow measuring and control device 100 therein. Openings 1001 should be provided in the casing 1000 to allow the input and output of water into the water inlet 102 and from the water outlet 106, respectively. This inside of the casing 1000 may further comprise parts that mate with specific locations on the water flow measuring and control device 100 to ensure that the water flow measuring and control device 100 is firmly held in the casing 1000.

According to an embodiment, there is provided a transceiver 2000 operatively connected to at least one of the sensors 15 and to the solenoid 220.

According to an embodiment (not shown), the transceiver 2000 is provided within the casing 1000. According to another embodiment, as shown in FIG. 5-8B, the transceiver 2000 is provided in its own transceiver casing 2200 which mates with the casing 1000 to be coupled therewith.

According to an embodiment, the casing 1000 is provided with a transceiver mating portion 1999, which is shown as a recess in the casing 1000. Similarly, the transceiver casing 2200 can comprise a casing mating portion 2999, which is shown as a protrusion which mates with the recess in the casing 1000. Other types of mating connectors could be provided, as long as a mechanical connection is provided and as long as this mechanical connection also allows the passage of an electrical connector 2010 between the transceiver 2000 and the water flow measuring and control device 100 which eventually electrically connects to at least one of the sensors 15 and the solenoid 220 for receiving data and sending instructions.

The transceiver 2000 can be a receiver if it is only adapted to receive signals or a transmitter if it is only adapted to transmit signals. If it can perform both, it is a transmitter. In all cases, some form of input/output (I/O) 2100 such as an antenna for communication with a communication network or a wired connection, is provided and used for data transmission and/or reception.

According to an embodiment, the transceiver 2000 can comprise basic computing capabilities in a transceiver computing device 2002, or microcontroller. For instance, it can comprise a memory 2110 for storing data, including instructions, and a processor 2120 (or microprocessor) operatively connected to the memory 2110 for executing the instructions. The processor 2120 can further be operatively connected to the I/O 2100 to send or receive data which was processed or is to be processed. The I/O 2100 can be provided with the transceiver computing device 2002.

The processor 2120 is operatively connected to the electrical connector 2010 and therefore can receive the data from the sensors 15, and then store them in the memory 2110 and/or send them to the I/O 2100 for remote storing and/or remote processing.

Whether the processing of data is local (performed by the processor 2120 of the transceiver 2000) or remote from the transceiver 2000 (e.g., performed by a remote server or another computer as received via the network to which the I/O 2100 is connected), information can be extracted from the data. For example, the data can be analyzed to build a portrait of water consumption per appliance in the building serviced by the plumbing being monitored by the water flow measuring and control device 100. The data includes the data from the sensors 15, which generate a time series of net flow of liquid in the flowmeter chamber 110, or of frequencies directly proportional to the flow rate through the pipe fitting, as mentioned above. This time series can be analyzed, and actions may be taken, after having been triggered by the processor as a result from the analysis that is performed.

According to an embodiment, the extraction of information from the data comprises: identifying or recognizing patterns in the time series of flows, correlating the identified patterns with known patterns associated to known water-consuming events, and therefore identifying specific events taking place in time along with their net consumption of water. There can be between one and three time series of data to analyze, depending if data from the thermometer 20 is collected and used, and if the data from the pair of sensors 15 is kept separate or merged into a single time series of net flows.

Temperature and water flow rate measurements are collected in the water flow measuring and control device 100 by the thermometer 20 and the movement sensors 15 and sent over a communication network (such as the Internet) to a remote computing system (e.g., one or more servers for storing a database such as a cloud database and executing instructions to process the data) via the transceiver 2000. This is performed repeatedly, for example at a given frequency (e.g. every second). Classification and machine learning algorithms will enable artificial intelligence through pattern recognition and predictive analysis on the data flow and temperature data. Pattern recognition and predictive analysis will be performed on a per device basis, and over groups of devices.

Water-consuming events include any device, apparatus or appliance under use which consume liquid from the plumbing in which the water flow measuring and control device 100 is installed, for example: toilet flushing, faucet running, washer rinsing clothes or flushing its water, dishwasher bathtub being filled up or being emptied, shower being used, hose being used, etc. The same appliance located at a different location in the building, toilet on the second floor versus toilet in the basement, are different events since they do not generate the exact same flow pattern at the location of the water flow measuring and control device 100. The time series associated with the water-consuming events make up what can be defined as a signature since the pattern is usually distinguishable from the patterns from other events or appliances. This signature can be referred to as a water usage signature (WUS).

There is an impressive variety of appliances that can be used with the plumbing, including faucets, toilets, urinals, dishwashers, washing machines, shower heads, baths faucets, swimming pool equipment, hoses, etc., and within each type of appliance and between different types of appliances, there are various water flows, durations and multiple-cycle characteristics that together form a signature of the water usage of the particular appliance. Although appliances of different types have signatures that are typically more easily distinguishable, appliances of the same type may also be distinguishable, especially with a sufficiently high resolution in flow measurements and/or by calibrating the device. For example, an old toilet model can use 13 liters/flush, whereas a high efficiency toilet can use as little as 5 L/flush. Pressure varies by location, time of day, and season, and adds some complexity to the identification of a signature.

In order to recognize WUS of appliances, machine learning, consisting of data collection and water usage signature model training, needs to have taken place before the identification or pattern recognition process. #Data collection can be performed in a supervised or unsupervised mode. In supervised mode, data collection can be performed by first plugging the water flow measuring and control device 100 into the plumbing and then to generate a water-consuming event. The water flow measuring and control device 100, used in calibration mode, recognizes the existence of an event and prompts the user for a label or identifier for this event; the WUS pattern is then recorded along with the label or identifier. In unsupervised data collection mode, the appliance type is known a priori thus eliminating the need to manually label the WUS pattern. This data collection mode is possible in setting such as public toilets, where a separate water flow measuring and control device is placed before the set of toilets, urinals, and faucets.

Using the water flow measuring and control device 100 may involve various roles which can be occupied by the same person or different persons. For example, an occupant is defined a person in a dwelling where the water flow measuring and control device 100 has been installed. A configurator is defined as a trained technician, who can be an informed occupant. An administrator is defined as a trained system administrator, who can be an informed occupant.

Patterns that can be recognized can be signatures of water usage and appliances; patterns in water consumption in a single dwelling; and/or patterns in water consumption over groups of dwellings.

Figure 9:
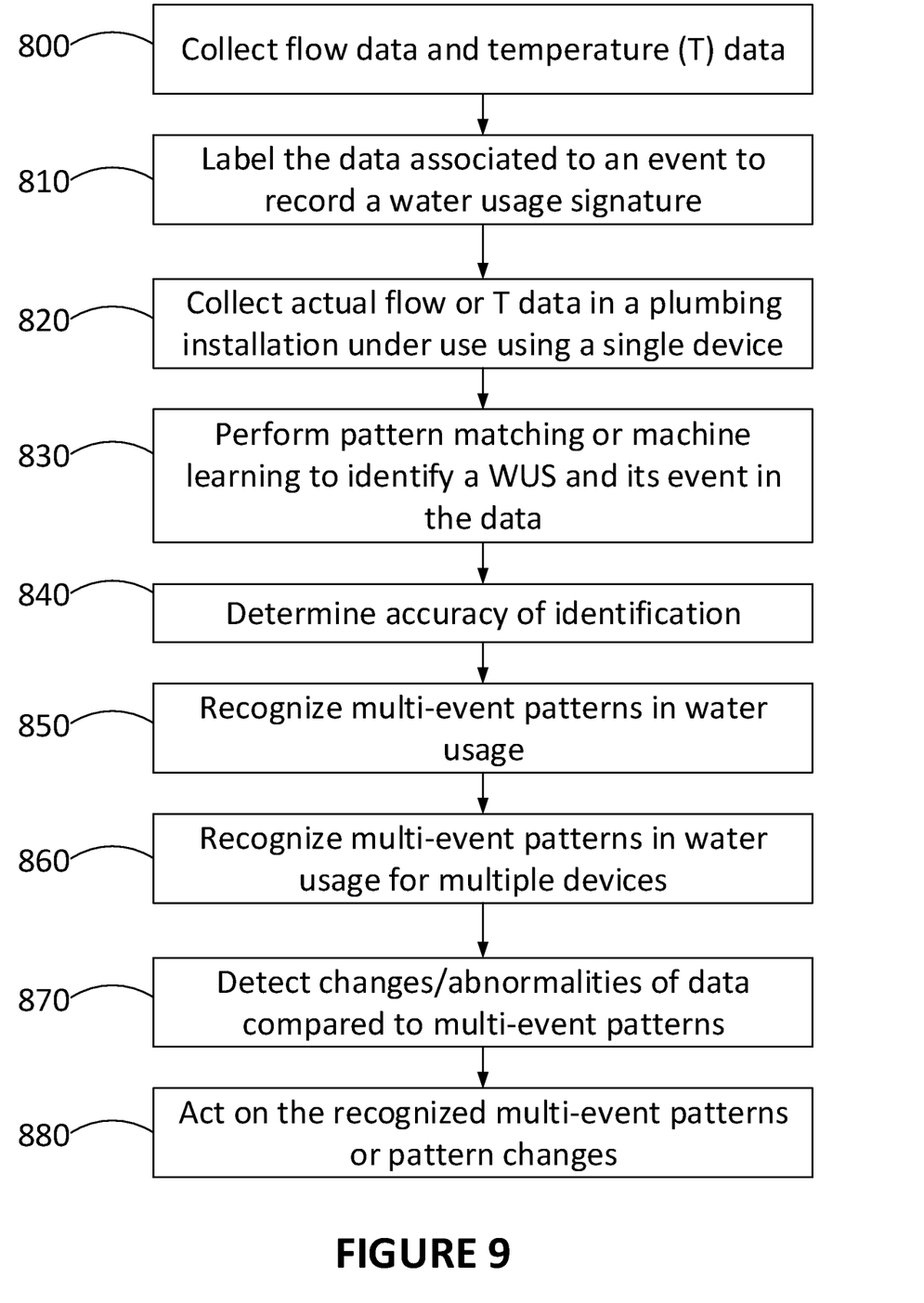
FIG. 9 is a flowchart illustrating the way a water flow measuring and control device can be used with a computer to identify water-consuming events based on water-usage signatures in the data measured by the water flow measuring and control device, according to an embodiment.

According to an embodiment, the way to perform such a pattern recognition is as follows, in relation with FIG. 9:
1. capture flow using the flowmeter 10 and temperature using the thermometer 20 from each device every second to the database, which can be a cloud database installed in one or more remote servers (step 800);
2. label flow and temperature measurement intervals in order to correlate flow patterns to water usage (i.e., calibrate, step 810);
3. capture and label a dwelling's WUS set (step 820);
4. use WUS pattern recognition algorithms, e.g., pattern matching or machine learning algorithms (step 830) to identify that an appliance (the one generating the WUS) was used;
5. determine the pattern recognition algorithm's accuracy in detecting a WUS event (step 840);
6. recognize long-term patterns in water consumption (sets of WUS, and WUS events) in a dwelling (step 850); "long-term" is simply considered as longer than a WUS-generating event (i.e., multi-event pattern), in order to assess which events can be correlated;
7. recognize long-term patterns in water consumption over groups of dwellings (step 860); "long-term" is simply considered as longer than a WUS-generating event (i.e., multi-event pattern), in order to assess which events can be correlated;
8. detect changes in WUS long-term patterns to identify abnormal situations (step 870);
9. act on the recognized patterns or pattern changes (step 880).

In order to capture and label a WUS, it is possible to implement a manual WUS labeling procedure. There is provided a computer-implemented user interface (UI) for the configurator, which is used to indicate WUS event start and, upon performing the WUS (e.g. flush the toilet, fill the bathtub, etc.), to label the WUS event in the UI with information concerning the event (e.g. event name, category, typical frequency, etc.).

In another embodiment, which is not mutually exclusive with the previous one, it is possible to implement a triggered WUS labeling procedure (a WUS event occurs, but it is not recognized). The Configurator is notified of an unrecognized WUS event, and then is asked if this is an occurrence of a previously labeled WUS. If yes, the WUS is updated with the new pattern. If no, the configurator is asked to label the WUS.

In order to capture, label, and confirm a WUS, the UI can be used to manage the list of WUS in a dwelling (could be a prepopulated dropdown menu, which can be edited), and a manual WUS labeling procedure is then implemented. The UI can be used by the configurator to indicate WUS event start in the UI. Once the WUS is performed (e.g. flush the toilet, fill the bathtub, etc.), the UI issued to label the WUS event in the UI with information concerning the event (e.g. event name, category, typical frequency, etc.). Afterwards, when a WUS event occurs, it is either recognized or not by the recognition program. If not recognized, the configurator is notified of an 'unrecognized WUS event' and asks if this is an occurrence of a previously labeled WUS. If yes, the WUS in the database of signatures is updated with the new pattern. If no, the Configurator is asked to label the WUS, which is added to the database of signatures. Otherwise, if the WUS event occurs and is recognized by the program, the configurator can be notified of the recognition of the WUS event (e.g. toilet flush), and optionally, the configurator is asked to confirm (yes/no).

Correlating an identified pattern in the time series to a known pattern of an event can be performed in various ways. Linear models such as a linear combination of the WUS, can be used to match the WUS to segments of the measured time series. The sum of WUS that minimizes the difference with the measured time series, is an example of a straightforward way to correlate the WUS in the database to the measured signal(s) to perform the matching. However, this method can be more prone to mistakes in the matching (false positives), and some matching between time series and known patterns can be missed (false negatives).

Other ways to match a segment of the measured time series to known patterns involves nonlinear methods, such as statistical pattern recognition. It is possible to train dependent and independent statistical WUS models. Dependent statistical WUS models are specific to each WUS collected from a dwelling or group of dwelling. Independent statistical WUS models are generalized over all data collected on a WUS. Otherwise, it is possible to run classification algorithms (s) to match a new water consumption event to the WUS statistical models. This way, it is also possible to extract individual WUS events from a WUS containing multiple WUS events.

Afterwards, the pattern recognition algorithms' accuracy in detecting a WUS event can be assessed, either by supervised methods (prompt the occupant after each WUS event for confirmation, e.g., "Did you just flush the toilet?"), or by unsupervised methods (e.g., from machine learning).

In order to recognize patterns in water consumption (sets of WUS, and WUS events) in a dwelling; recognize patterns in water consumption over groups of dwellings; and detect changes in WUS patterns, various data can be collected and analyzed, for example, without limitation: occupant profile, dwelling profile, If This Then That (IFTTT) rules, history of IFTTT events, WUS set of the dwelling, WUS set of all known water usage patterns and devices, history of WUS events, etc.

It is then possible to act on the recognized patterns or pattern changes in order to: predict water consumption based on usual consumption, detect abnormal water consumption activity (activity that substantially departs from the predicted water consumption) and notify to occupant and/or Admin; provide suggestions for reducing water consumption; detect appliance deterioration from WUS events over time; compare dwelling's WUS pattern to more efficient appliance(s) from vendor(s) and suggest replacements along with an analysis of savings, etc. The abnormal water consumption activity may include overuse (including pipe breaks and appliance breaks) or leaking, for example. Overuse or leaking each involve a different process of detection, since overuse detection is based on a method for identifying unusual events from the collected data, while leaking detection is rather based on a low threshold for measuring flows in the device.

EXAMPLE 1: OVERUSE IDENTIFICATION

From the data collected and gathered in the database (e.g., on the cloud), an automatic recognition of the WUS can be performed for a faucet, a urinal, a toilet reservoir fill, a dishwasher cycle, and other WUSs. Algorithms for pattern recognition can thus be applied on the data in the database by a computing device (such as a server) to provide behavioral and predictive analytics, and Artificial Intelligence (AI) capabilities. Thresholds, either predetermined or inferred over time by the AI capabilities, can be used as triggers to notify users of abnormal activity. The notification can be done by sending a notification signal, via or from a remote server, to the mobile device of the user having the appropriate application installed thereon for receiving notifications from the remote server.

In an application of the method, an analytic module can analyze water consumption from particular water-consuming appliances and generate a portrait of water usage over a long-term period. For example, as a dishwasher or a washing machine gets older, it can deteriorate and use a different amount of water for each use. This change can be detected and, upon a given threshold, the information on the operational changes of the appliance can be communicated to the user through the application used on a personal electronic device.

Another application of the method would be to detect abnormally long use of water that would be indicative of a problem. For example, a person with Alzheimer's disease can leave a faucet running without noticing. Alternatively, an elderly person can fall while taking a shower, leaving the shower running while being incapacitated. In each example, an employee or a relative using the application or website can be alerted of this event and take action.

Another example of the application of the method would be the determination that a room or apartment rental is being used more than expected. For example, an apartment can be rented on Airbnb® with a rate for two clients, or an agreement that the occupancy should be limited to two clients. For example, the building in which a condo is being rented can have rules for maximum occupancy for short-term rentals. Since people cannot be monitored inside the room by cameras, water usage can be monitored instead as a proxy for actual occupancy. The device and method can thus be used to determine that the water usage is more representative of four or five people in the apartment, and the renter can thus suspect that the occupancy is higher than agreed in the short-term rental contract.

In another example, the device and method can be applied to the scheduling of public toilet maintenance. Installing cameras in public restrooms to estimate maintenance needs is usually not acceptable and even illegal, and counting the number of people passing by the entrance of the public restroom may not be an accurate estimation of maintenance needs. The device, along with the method for WUS identification and logging, can track and count the number of water-consuming events in the public restroom. Some events, such as the use of faucets for a considerably long time or multiple flushes of toilets are more indicative of the maintenance needs. By collecting information from multiple public restrooms, the rate at which the need for maintenance increases can be assessed for each one of them and a scheduling that is more representative of actual needs can be generated by an AI module.

EXAMPLE 2: LEAK DETECTION

A leak is detected if there is a non-zero water flow when there is no WUS activity. It is detected even if the leak is hidden behind a wall. According to an embodiment, if a water flow problem is detected, the device will shut off the water and notify registered users. Shutting off the water is performed automatically, i.e., without any human intervention between the detection of the problem and the notification to users.

Plumbing installations may suffer from leaks, which can be hard to detect if the leaking flow rate is low. Leak rates of 1 drip (about 0.05 ml) per minute result in 0.27 L per day. Leaks in pipes behind walls can occur for months before being noticed. By that time, there can be significant water damage and mold. Pipe breaks can occur from faulty connections and pipe degradation over time. Measuring the consumption rate of the leak can also be performed (e.g., detecting a running toilet) although it is more critical in countries where water usage is paid; otherwise the focus can be given to detecting the existence of leak.

The device as described above, with the wheel 12 and sensors 15 inside the arrangements of FIGS. 1 and 4, can detect leaks of 1 drip/minute (0.05 mL/minute) and measure flow rates that can range from 0 to about 40 L/min (LPM), and higher in larger commercial piping. In other words, the flowmeter described above has sufficient accuracy at low rates to be able to detect drips. This feature is provided while also being able to measure consumption rates (and perform pattern recognition) of substantial flows without affecting the flow.

These features are not achieved by prior art leak detectors. Existing floor moisture detectors can detect the presence of water by contact. However, these devices cannot detect leaks and pipe breaks behind walls, nor do they enable pattern recognition of water appliances. Flow meters (including paddle wheels, rotary pistons, or turbines) are expensive and add resistance to flow, thus reducing pressure in the plumbing that is used for everyday life (showers, water hoses, faucets, etc.). Differential pressure flow meters are sensitive to pressure changes in the system; good for leak detection, but cannot be used to measure a flow rate. Coriolis flow meters provide accuracy up to 0.1%, but they are large and expensive. Sonic flow meters are reasonably small and low cost, but have limited accuracy (0.5% typical), but cannot measure below 1 m/s and can't be used with dirty or contaminated liquids. Electromagnetic flow meters offer non-invasive sensing and can achieve accuracies of 0.2%; however, accuracy degradation can occur from fluid turbulence, stray electrical currents in the fluid and electrical noise, both radiated and conducted. Precision flow meters for medical applications (e.g., Proteus) can measure a flow down to 0.2 LPM at 3% accuracy, this performance being insufficient for leak detection as contemplated herein.

As described above, the device comprises a bypass chamber 101 in which the fluid flows in parallel with the main flow chamber 108 fitted on the piping. Water flow is diverted from the main pipe into the bypass chamber through a small entry point thereof, which houses a mechanical measurement device that converts flow to frequency. To detect leaks, any flow in the main chamber is also proportionally present in the bypass chamber and registered by the mechanical measurement device by converting flow rate to an electrical frequency that is read by a microcontroller. The isolation of the bypass chamber from the main chamber ensures (a) there are no obstacles in the main chamber flow path that can reduce pressure and (b) there are no obstacles the main chamber flow path that could cause accumulation of debris or deposits that would reduce pressure over time.

To further increase the sensitivity of the device to perform detection of leaks with significantly small flows (e.g., drips at 0.05 mL/minute), pressure sensors are mounted on the valve. A first pressure sensor is provided at the input upstream of the electrovalve to measure a first pressure, and a second pressure sensor downstream of the electrovalve to measure a second pressure. The pressure data is collected by the pressure sensors and sent to the microcontroller for local or remote analysis. To determine if there is a leak, the microcontroller is programmed to instruct the shutting electrovalve for a given period of time which is small enough to avoid affecting the normal operation of an appliance. During this temporary closure, the outside (first) pressure and the inside (second) pressure are continuously compared. If the inside pressure is less than the outside pressure, there is a leak. Otherwise, if there is no pressure drop, there is no leak and the valve is reopened. If a large pressure drop is detected (e.g., above a predetermined or AI-determined threshold indicative of normal use), the microcontroller also reopens the electrovalve as it is assumed normal water usage is in progress, and the leak detection algorithm should be terminated. The leak corresponds to a small non-zero pressure drop to a medium pressure drop (under the threshold). The leak algorithm is runs only when there is no WUS detected to avoid affecting the flow of an appliance under use.

Theoretically, if there is no appliance in use, there should be no water flow in the plumbing. After empirical testing of the device described herein, it has been determined that leakage to drain is a common occurrence (e.g., having a leaky toilet flapper is common). This baseline leakage can be acceptable for homeowners (e.g., where water is not paid according to its consumption) since there is no damage to properties made by this kind of leakage. The device as described herein has enough sensibility to detect additional leaks, i.e., in addition to this baseline leakage. Since the collected data is stored and analyzed, the system can remember the existence and the level of the baseline leakage and only notify the user of leaks that are identified of being in addition to this baseline leakage.

A sudden pipe break can occur from a faulty pipe connection, pipe degradation over time, or a broken connection to an appliance. When a break occurs, water damage can be catastrophic. The key is distinguishing between regular water usage (shower, watering a lawn, etc.), which has a WUS, and a pipe break, which has no WUS, and turning off the water as quick as possible (e.g., by triggering the solenoid 220) to minimize damage, and not annoy the occupant with notifications that end up being false negatives. The break algorithm constantly runs, after being trained on normal WUS activity, to detect abnormal activity such as pipe breaks and run-on toilets. The notification to the user can be done by sending a notification signal, via or from a remote server, to the mobile device of the user having the appropriate application installed thereon for receiving notifications from the remote server.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system comprising:
   a fluid flow measuring and control device for installation within plumbing that channels a fluid, the device comprising:
   a flowmeter for assessing the fluid flow in the device;
   a main flow channelling system having an inlet and an outlet for connection to the plumbing;
   a bypass channelling system in parallel from the main flow channelling system, starting from a first location on the main flow channelling system and ending at a second location on the main flow channelling system downstream of the first location;
   a valve for stopping the fluid flow in the main flow channelling system, hence blocking fluid flow in the fluid flow measuring and control device and in the plumbing; and
   a first pressure sensor upstream of the valve and a second pressure sensor downstream of the valve to determine if there is a pressure drop when the valve is closed;
   a transceiver operatively connected to the flowmeter for collecting data therefrom and send the data to a computer; and
   the computer comprising a memory for storing pre-recorded fluid usage signatures of specific appliances and for storing instructions and a processor operatively connected to the memory for executing the instructions to compare the data to the pre-recorded fluid usage signatures for identifying in the data from the flowmeter that a specific appliance was used.

2. The system of claim 1, wherein the computer is further adapted to at least one of:
   identify an abnormal fluid usage by comparing the data from the flowmeter from previously acquired data from the flowmeter; and
   identify an identity of the specific appliances which consume fluid.

3. The system of claim 1, wherein the flowmeter is provided in the bypass channelling system for measuring the fluid flow in the bypass channelling system and thereby estimating the fluid flow at the inlet or at the outlet of the main flow channelling system.

4. The system of claim 3, wherein the flowmeter comprises:
- a flowmeter chamber;
- a flowmeter wheel installed in the flowmeter chamber, the flowmeter wheel comprising rotating blades; and
- a pair of movement sensors installed in the flowmeter chamber, each one of the movement sensors monitoring the rotating blades alternately moving in opposite directions and identifying a direction of a rotation movement to assess a net flow through the flowmeter chamber.

5. The system of claim 1, wherein the valve comprises a solenoid valve.

6. The system of claim 1, wherein the computer is operably connected to the first pressure sensor, the second pressure sensor and the valve, to determine from the data from the flowmeter that no appliance is being used and instruct the valve to close to collect pressures from the first pressure sensor and the second pressure sensor.

7. The system of claim 6, wherein the computer is further adapted to:
- detect that there is a pressure drop and determine from a low to medium pressure drop that it is a leak, and to maintain the valve closed, and
- detect that there is no pressure drop or a high pressure drop indicative of normal use, and reopen the valve.

8. The system of claim 7, wherein the computer is further adapted to instruct the transceiver to send a notification to a remote server to inform a user mobile device in communication with the remote server.

9. A method of pattern recognition for fluid use in a plumbing installation to which fluid consuming appliances are fluidly connected, the method comprising:
- installing a fluid flow measuring and control device at a single location in the plumbing installation which is fluidly common to all of the fluid consuming appliances, the device comprising
  - a flowmeter for assessing the fluid flow in the device;
  - a main flow channelling system having an inlet and an outlet for connection to the plumbing;
  - a bypass channelling system in parallel from the main flow channelling system, starting from a first location on the main flow channelling system and ending at a second location on the main flow channelling system downstream of the first location;
  - a valve in the main flow channelling system; and
  - a first pressure sensor upstream of the valve and a second pressure sensor downstream of the valve;
- capturing and storing data relative to a flow rate of each one of the fluid consuming appliances in the plumbing installation through the fluid flow measuring and control device;
- analysing and recording the data to determine a fluid usage signature for each of the fluid consuming appliances, thereby resulting in pre-recorded fluid usage signatures for each of the fluid consuming appliances
- stopping the fluid flow in the main flow channelling system using the valve, hence blocking fluid flow in the fluid flow measuring and control device and in the plumbing; and
- determining if there is a pressure drop when the valve is closed by using the first pressure sensor upstream of the valve and the second pressure sensor downstream of the valve.

10. The method of claim 9, further comprising, in an actual use of the plumbing installation:
- comparing an actual measurement of the fluid flow measuring and control device to the pre-recorded fluid usage signatures for each of the fluid consuming appliances to identify which one of the fluid consuming appliances corresponds to the actual measurement.

11. The method of claim 10, further comprising:
- comparing an actual measurement of the fluid flow measuring and control device to the pre-recorded fluid usage signatures over a given recurring period to identify a difference with the pre-recorded fluid usage signatures;
- issuing a notification signal upon determining that the difference exceeds a given threshold.

12. The method of claim 10, further comprising:
- identifying that the actual measurement of the fluid flow measuring and control device contains none of the pre-recorded fluid usage signatures;
- temporarily shutting a valve in the fluid flow measuring and control device;
- measuring a first pressure upstream of the valve and a second pressure downstream of the valve;
- identifying a difference between the first pressure and the second pressure; and:
  - if the difference is zero or is above a threshold indicative of normal use, reopen the valve;
  - otherwise, maintain the valve closed.

* * * * *